United States Patent [19]

Barnsbee

[11] 4,230,662

[45] Oct. 28, 1980

[54] METHOD FOR FORMING HOLES IN THERMOFORMED ARTICLES

[75] Inventor: Clive D. Barnsbee, Webster, N.Y.

[73] Assignee: Eastman Kodak Company, Rochester, N.Y.

[21] Appl. No.: 6,052

[22] Filed: Jan. 24, 1979

[51] Int. Cl.³ .................. B29C 17/04; B29C 17/08
[52] U.S. Cl. .................................. 264/553; 264/154
[58] Field of Search ............... 264/154, 544, 550, 553, 264/536; 425/290, 302.1, 388; 65/94, 97, 105, 106

[56] References Cited

U.S. PATENT DOCUMENTS

| | | |
|---|---|---|
| 3,038,198 | 6/1962 | Schaar . |
| 3,163,686 | 12/1964 | Pusel et al. ...................... 264/154 X |
| 3,172,927 | 3/1965 | Mosonnier ...................... 425/388 X |
| 3,187,380 | 6/1965 | Harrison . |
| 3,375,551 | 4/1968 | Sherlock . |
| 3,381,068 | 4/1968 | Leiper et al. |
| 3,555,652 | 1/1971 | Ignell ............................... 425/290 X |

FOREIGN PATENT DOCUMENTS 1167513  10/1969  United Kingdom ..................... 264/536

*Primary Examiner*—Jan H. Silbaugh
*Attorney, Agent, or Firm*—M. S. Sales

[57] ABSTRACT

A method and apparatus for thermoforming articles from plastic sheet material and for forming holes in the thermoformed articles in a single operation involves heating the material and vacuum drawing the heated material into a mold cavity which has an aperture corresponding in shape to the desired hole. The underside of the mold cavity is tapered outwardly away from the aperture, and, as the sheet material is drawn into the cavity, it follows the taper, is thinned, and is trapped in the cavity. The hole in the article is created when the sheet material not drawn into the cavity is stripped from the mold.

5 Claims, 6 Drawing Figures

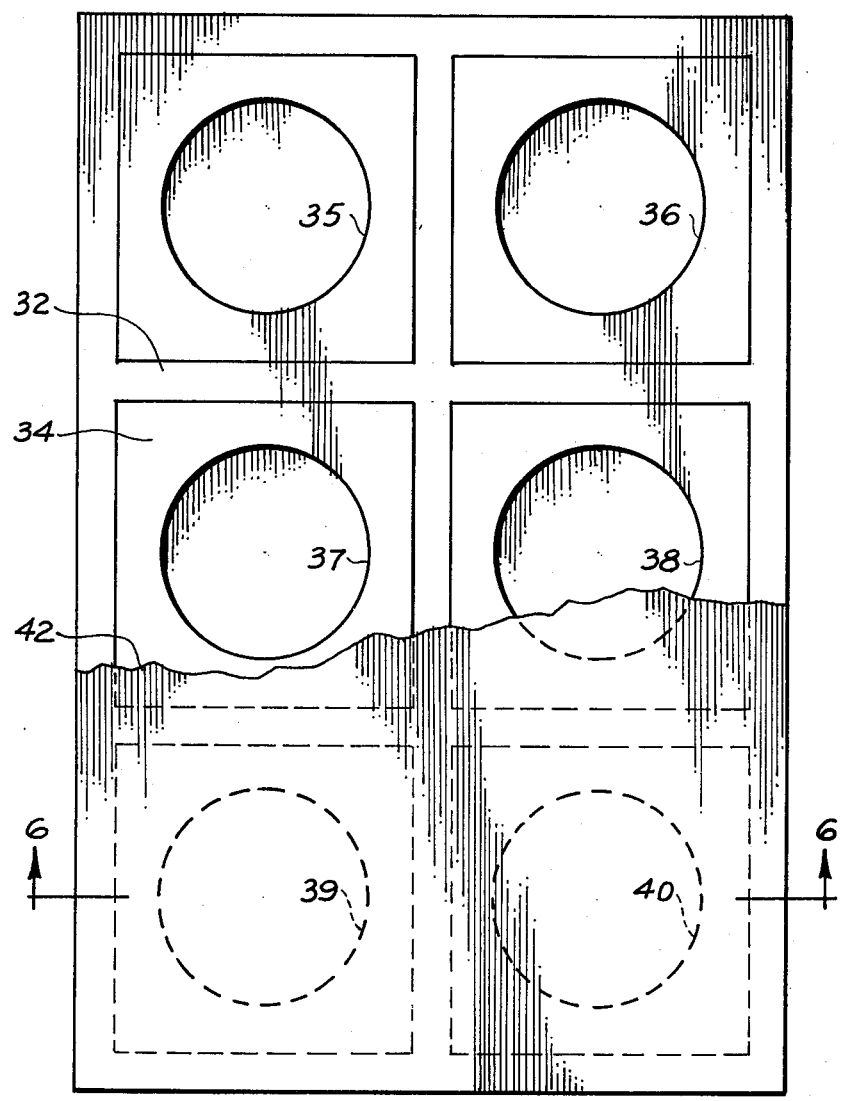
_Fig. 5_
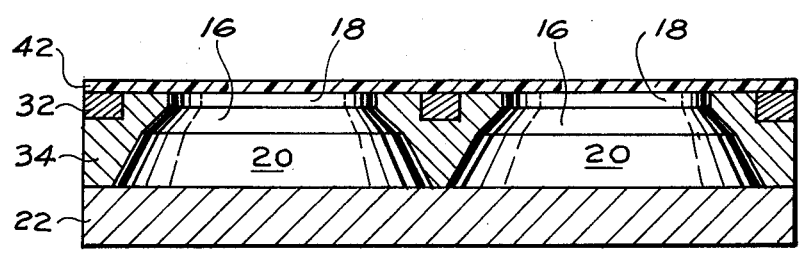
_Fig. 6_

METHOD FOR FORMING HOLES IN THERMOFORMED ARTICLES

BACKGROUND OF THE INVENTION

1. Field of the Invention

The present invention relates to making articles by thermoforming techniques, and more specifically to forming holes in such articles during the thermoforming process.

2. Description of the Prior Art

Thermoforming techniques have been successively used for molding thin-walled articles from plastic sheet material. To provide openings or holes in such thermoformed articles, it is customary to perform an additional, punching operation after the article has been formed.

Such punching operations involve the provision of extra equipment, such as a set of punches and dies at a punch station, means for transporting the formed articles to the punch station, and indexing means for locating the articles relative to the punching equipment. The cost of such extra equipment constitutes a considerable portion of the expenditure involved when setting up to manufacture this type of article. Also, the secondary, hole punching operation requires close tolerance indexing of the article at the punch station. In accordance with the present invention, a method and apparatus are provided for manufacturing thin-walled plastic articles from sheet material which eliminates the need for punching equipment and a secondary, hole punching operation.

SUMMARY OF THE INVENTION

A method and apparatus for thermoforming articles from plastic sheet material and for forming holes in the thermoformed articles in a single operation involves heating the material and applying a pressure differential across the heated material to expand the material into a mold cavity. The mold has an aperture corresponding in shape to the desired hole. The aperture opens into a cavity which traps the sheet material preferably by being tapered outwardly away from the aperture. As the sheet material expands into the cavity, it follows the taper and is thinned and trapped in the cavity.

The hole in the article is created when the sheet material not expanded into the cavity is stripped from the mold. The mold geometry and the thinned configuration of the material at the aperture causes high stress concentrations and fracture of the sheet material at the aperture. The article is stripped from the mold with a hole corresponding to the aperture, and the waste is removed from the cavity in preparation for the next forming cycle.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which:

FIG. 5 is a top plan view of apparatus in accordance with another embodiment of the present invention; and FIG. 6 is a section view taken along 6—6 of FIG. 5.

DESCRIPTION OF THE PREFERRED EMBODIMENTS

Figure 1:
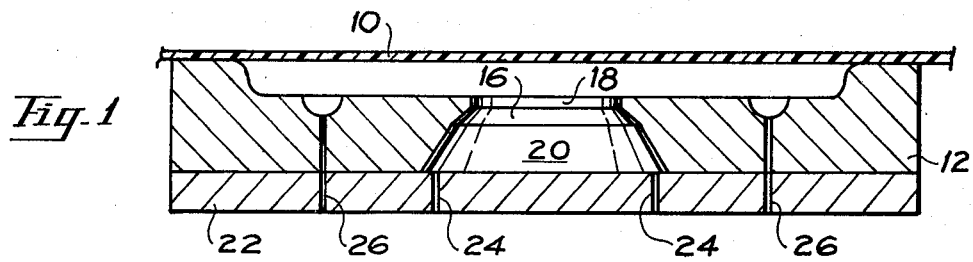
FIGS. 1-4 are sectioned elevational views of apparatus in accordance with one embodiment of the present invention showing the sequence of operation of the apparatus.

The present invention will be directed in particular to elements forming part of, or cooperating more directly with, methods and apparatus in accordance with the present invention. It is understood that elements, components, and/or subcomponents not specifically shown or described may take various forms well known to those skilled in the art.

Thermoforming machines are well known and generally include an upper and lower platen, at least one of which is movable toward the other to close upon a sheet of thermoplastic material. The sheet material is softened by heat and then formed while in the softened state by application of a pressure differential to draw or press the material against the contours of a mold or die or both.

In the illustrated embodiment of the present invention, one platen carries a female mold which may be provided with temperature regulating means. The female mold is also provided with suitable passages for drawing a vacuum at various locations therein. A conventional assist plug having an air supply tube may be provided on the other platen (not shown) to introduce compressed air into one side of the sheet material to press the thermoplastic material into intimate contact with the female mold.

FIGS. 1-4 are sectional views showing four stages of a thermoforming operation in which a sheet 10 of thermoplastic material is to be molded into a predetermined shape with a hole therethrough. The thermoplastic sheet is positioned above a mold part 12 having a female contour corresponding to the shape of the desired finished article.

Mold part 12 has an aperture 16 therethrough which is slightly larger than the size of a desired hole in the finished article. The mold is chamfered all around the aperture at 45° taper. Ideally, the upper edge of aperture 16 would be sharp for producing the cleanest holes in sheet 10. However, a sharp edge would be subject to nicking and dulling during use. Accordingly, the preferred embodiment has a small flat 18 in this region to increase mold life. The side of mold part 12 away from sheet 10 is relieved to form a chamber 20 concentric with aperture 16 to provide an expansion volume for the stretching and thinning of sheet 10 over flat 18.

A lower mold platen 22 closes chamber 20 and is provided with a plurality of vacuum draw holes 24 in platen 22 arranged along a locus corresponding to the shape of chamber 20 and just within the boundary of the chamber. Additional draw holes 26 may be provided within the mold as required.

OPERATION

Figure 2:
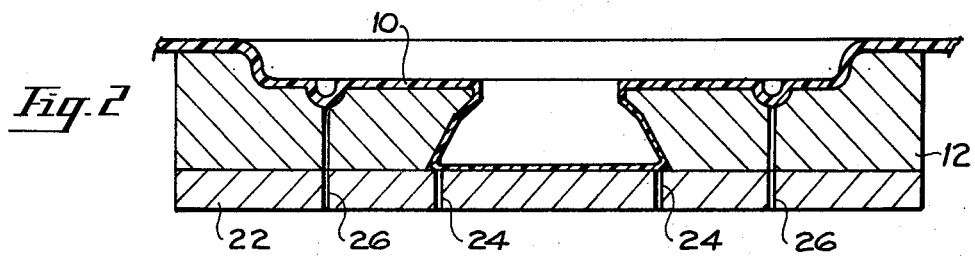

In operation, plastic sheet 10 is heated to, or slightly above, its normal forming temperature and positioned over mold part 12 as shown in FIG. 1. Vacuum is applied below the sheet through draw holes 24 and 26 so that the sheet is drawn into the mold and follows the mold contour, including flat 18, the chamfer of aperture 16 and the walls of chamber 20 (FIG. 2). Because of the expansion of the sheet in chamber 20, the material is substantially thinned over flat 18 of aperture 16. While the material must be adequately thinned, a sufficient thickness should be retained to prevent "blow through" holes from appearing.

Figure 3:
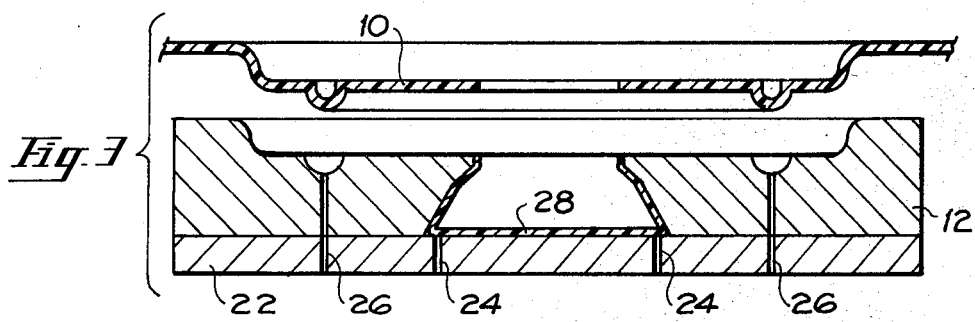

Because of the reverse taper of the chamfer of aperture 16, the material within chamber 20 is trapped in the mold. When the article is stripped off the mold, the thinned condition of the plastic material at flat 18 causes a fracture crack to propagate around the flat. The article is thereby separated from the material in chamber 20, as shown in FIG. 3.

Figure 4:
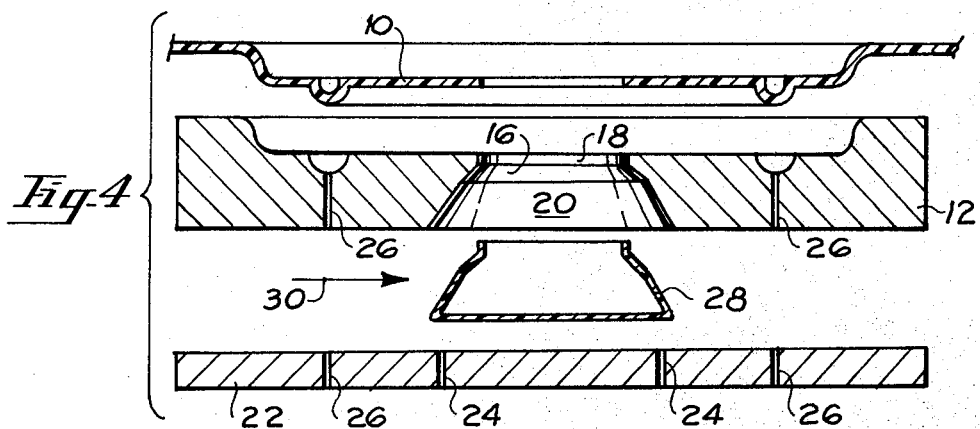

The scrap material 28 is retained in the mold cavity after the separation step. Before the mold can be reused, the scrap material is removed from chamber 20. By separating upper mold part from platen 22 as shown in FIG. 4, scrap material 28 falls or can be pushed from the mold and removed by a gust of air represented by arrow 30.

During experiments using polystyrene sheets up to about 0.76 mm thick, round holes were successfully formed with diameters from 12.70 mm to 31.75 mm. The mold thickness was 6.35 mm, and flat 18 was about 0.25 mm. These tests were conducted with vacuum only. For holes smaller than about 6.5 mm diameter, it might be desirable to use plug assist or air pressure from above the sheet material, or both. In these tests, the forming temperature was about 220° F., but it will be understood that the forming temperature will depend upon the material and the mold configuration.

ALTERNATIVE EMBODIMENTS

At the separation step, sheet bending is preferably kept to a minimum so that bending or torsional forces do not act upon the thinned areas and cause unwanted cracking. In FIGS. 5 and 6, a frame 32 is shown nesting in cutouts in a mold 34. Six mold openings 35-40 are shown to form a like number of holes in plastic sheet 42 (FIG. 6). During separation, frame 32 is raised from mold 34 to support sheet 42 and minimize bending.

Both illustrated embodiments show forming circular holes in the molded articles. However, making non-circular holes is also feasible. Rectangular holes about 15.2 mm by 10.2 mm were successfully formed in 0.5 mm black polystyrene sheet. The rectangular holes are more difficult to form than circular holes because more cavity volume is available for material expansion and thinning at each corner of the rectangle than along the straight sections. This can cause the material to thin excessively and "blow out" around the corners before the material has sufficient time to form around the entire opening. Also, the forming of 90-degree corners in thin plastic tends to produce areas of high stress concentration and initiate unwanted cracks. It has been found that forming corners with a minimum radius of 1.5 mm solves these problems.

The invention has been described in detail with particular reference to preferred and alternative embodiments thereof, but it will be understood that variations and modifications can be effected within the spirit and scope of the invention.

What is claimed is:

1. A method of forming holes in articles during thermoforming of such articles from sheet material, said method comprising the steps of:
    A. heating sheet material to an article forming temperature;
    B. placing the heated sheet material adjacent to a mold having
        (1) a configuration corresponding to the article to be formed and
        (2) an aperture which
            (a) corresponds in area to the hole to be formed in the article and
            (b) opens into a cavity having a cross-sectional area in a plane generally parallel to the aperture larger than the area of the aperture;
    C. establishing a pressure differential across the sheet to
        (1) form the sheet against the mold configuration, and
        (2) expand the sheet into the cavity, thereby thinning the sheet in the region of the aperture and trapping a portion of the sheet in the cavity; and
    D. stripping the article from the mold thereby
        (1) causing the thinned region of the material to fracture at the periphery of the aperture and
        (2) leaving the trapped portion in the cavity to form a hole in the stripped article.

2. The method as defined in claim 1 wherein said pressure applying step comprises establishing a vacuum in the cavity to draw the sheet material into the cavity.

3. The method as defined in claim 1 further comprising the step of removing the trapped portion from the cavity.

4. The method as defined in claim 1 further comprising the steps of:
    dividing the mold to open the cavity; and
    removing the trapped portion from the opened cavity.

5. A method of forming holes in articles during thermoforming of such articles from sheet material, said method comprising the steps of:
    heating sheet material to an article forming temperature;
    placing the heated sheet material adjacent to a mold having a configuration corresponding to the article to be formed and having an aperture, corresponding in size to the hole to be formed in the article, which opens into a cavity adapted to trap a portion of the sheet material;
    establishing a pressure differential across the sheet to form the sheet against the mold configuration and to expand the sheet into the cavity, thereby thinning the sheet in the region of the aperture and trapping a portion of the sheet in the cavity; and
    stripping the article from the mold thereby causing the thinned region of the material to fracture at the periphery of the aperture and leaving the trapped portion in the cavity to form a hole in the stripped article.

* * * * *